United States Patent
Cheringal et al.

(10) Patent No.: US 12,180,766 B1
(45) Date of Patent: Dec. 31, 2024

(54) MULTIPLANE OBJECT DETECTION

(71) Applicant: Zoox, Inc., Foster City, CA (US)

(72) Inventors: William Edward Cheringal, Burlingame, CA (US); Andrew Allen Haskin, San Francisco, CA (US); Connor Joseph Kafka, San Francisco, CA (US); Da Liu, Milpitas, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 18/103,954

(22) Filed: Jan. 31, 2023

(51) Int. Cl.
 *E05F 15/00* (2015.01)
 *E05F 15/40* (2015.01)
 *B60J 5/04* (2006.01)

(52) U.S. Cl.
 CPC ............. *E05F 15/40* (2015.01); *B60J 5/0479* (2013.01); *E05Y 2400/44* (2013.01); *E05Y 2400/54* (2013.01); *E05Y 2600/45* (2013.01); *E05Y 2600/46* (2013.01); *E05Y 2900/531* (2013.01)

(58) Field of Classification Search
 CPC ..... E05F 15/40; B60J 5/0479; E05Y 2400/54; E05Y 2600/45; E05Y 2600/46; E05Y 2900/531
 See application file for complete search history.

(56) References Cited

U.S. PATENT DOCUMENTS

| | | | | |
|---|---|---|---|---|
| 5,149,921 A | * | 9/1992 | Picado | B66B 13/26 187/317 |
| 11,359,430 B2 | * | 6/2022 | Linden | E05F 15/73 |
| 2022/0410673 A1 | * | 12/2022 | Kanasugi | E05D 15/1047 |

* cited by examiner

Primary Examiner — Daniel J Troy
Assistant Examiner — Daniel Alvarez
(74) Attorney, Agent, or Firm — Lee & Hayes, P.C.

(57) ABSTRACT

Techniques for managing the doors of a vehicle are discussed herein. In some examples, a vehicle may have one or more doors configured to open and close. The doors may include one or more sensor devices located along the inside edges of the doors. The sensor devices may be configured to capture sensor data of a region between the doors. In some instances, the vehicle may have a door frame that may define a door aperture when the vehicle doors are in a non-closed state. The door frame may include one or more sensor devices located along an edge portion of the door frame. Such sensor devices may capture sensor data of the region within the door aperture. In such instances, a second plane (e.g., defined by the door frame) may be interior to a first plane (e.g., defined by the doors) relative to the vehicle.

20 Claims, 9 Drawing Sheets

MULTIPLANE OBJECT DETECTION

BACKGROUND

Vehicles may utilize various sensors to detect occupants as they enter and exit the vehicle. In order to ensure occupant safety, the vehicle can use sensor devices to determine whether occupants are between the vehicle doors. However, in many cases, such techniques may be suboptimal and can result in delayed, inaccurate, and/or insufficient responses when occupants are located between the vehicle doors.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
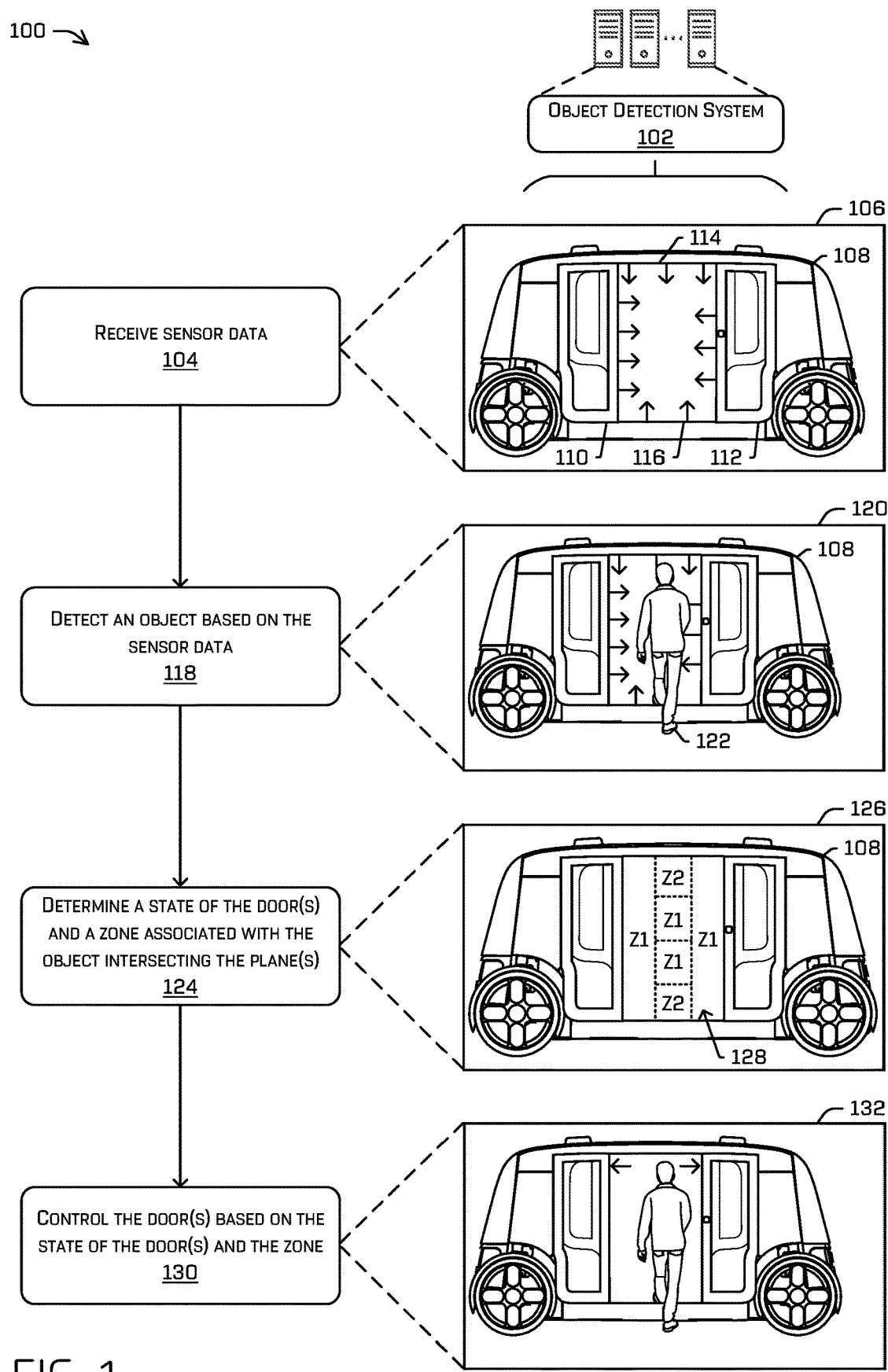
FIG. 1 is a pictorial flow diagram illustrating an example technique for detecting an object between doors of a vehicle, determining an action for the door(s), and controlling the doors based on the action, in accordance with one or more examples of the disclosure.

Techniques for managing doors of a vehicle, building, or other structure are discussed herein. In some examples, such techniques may be based on identifying an object between the doors and/or within the door aperture of a vehicle. As described herein, a multiplane sensor system may be used to identify objects and/or determine optimal responses (e.g., actions) for the vehicle doors. In some examples, a vehicle (such as an autonomous vehicle) may have one or more doors configured to open and close, enabling occupants to enter and exit the vehicle through an opening created by the doors while such doors are in an opened state. The doors may include one or more sensor devices (e.g., emitting and/or receiving sensor devices) located along the inside edges of the door(s). For example, the vehicle may have a first door and a second door that have inside edges that are generally aligned with one another and are oriented towards one another. In such examples, the first door may have emitting sensor devices that emit signals to receiving sensors of the second door, in addition to having receiving sensors that receive signals emitted from emitting sensor devices of the second door. As such, the sensor devices may be configured to capture sensor data of the region between the doors. Such sensor devices may establish a first sensor plane extending all or a portion of a height of the doors and a width based on the distance between the doors while in a non-closed state (e.g., opened state, closing state, opening state). In some instances, the vehicle may have a door frame that may define a door aperture when the vehicle doors are in a non-closed state. The door frame may include one or more sensor devices located along an edge portion of the roof, floor, and/or one or more vertical walls of the door frame. Such sensor devices may emit and/or receive signals vertically (using sensors located in the roof and/or floor) and/or horizontally (using sensors in the vertical walls of the door frame) capturing sensor data of the region within the door aperture. Such sensors may establish a second sensor plane extending all or part of the height and/or width of the door aperture. In such instances, the second plane (e.g., defined by the door aperture) may be interior to the first plane (e.g., defined by the doors) relative to the vehicle.

In some examples, the vehicle may use the sensor data from the door(s) and/or door frame to detect the presence of an object intersecting the first and/or second sensor plane(s). Based on detecting an object intersecting the first and/or second sensor plane(s), and based on a state of the doors (e.g., closed, opened, closing, opening, etc.), the vehicle may determine a response for the doors based on the detection of the presence of the object and the state of the doors. The vehicle may control the movement of one or both of the doors based on the determined response. As described in more detail below, the techniques described herein may improve vehicle safety by ensuring that objects are quickly and accurately identified, thereby stopping the doors from closing on such objects.

Conventional sensor systems that detect the presence of objects between vehicle doors can lead to delayed and/or inaccurate responses. For example, a vehicle may receive a request to navigate to a destination (e.g., pickup location, drop off location, delivery location, etc.). Upon arriving at the location, the vehicle may cause the door(s) to open allowing occupants (or potential occupants and/or consumers) to exit and/or enter the vehicle. When determining whether to close the doors, the vehicle may utilize one or more sensors to detect whether occupants and/or any other objects remain between the doors. However, the number and/or locations of the sensor devices may not provide full coverage of an entire area between the doors such that pedestrians and/or other objects may remain undetected while being present between the doors or within the door aperture. For example, vehicles may include a limited number of sensor devices located in the doors such that objects (e.g., smaller objects) between the doors may not be detected by the sensors (e.g., may pass between or outside the sensor coverage area). Further, some vehicles may have sensor devices which may be deficient at detecting objects that are located within the door aperture. Consequently, door sensor systems may fail to identify objects that are within the door aperture (e.g., a passenger or object that is moving toward the doors in the process of exiting the vehicle but has not yet broken a plane of the doors). Further, even if the sensor devices accurately identify an object between the doors, the vehicle may cause the doors to perform a single action regardless of where the object is located. For example, upon detecting an object between the vehicle doors, vehicles may utilize a general instruction for the doors to return to a fully opened state. However, in situations in which an occupant is proximate to vehicle hinges, causing the doors to move may increase the likelihood of causing additional harm to the occupant (e.g., pinching a hand or finger in the hinge). Accordingly, using such conventional object detection systems may result in delayed, inaccurate, and/or insufficient responses.

To address these and other technical problems and inefficiencies, the systems and/or techniques described herein include an object detecting system (which also may be referred to as an "object detection system" or a "detection system") configured to manage the response and/or movement for the doors of a vehicle based on locating one or more objects within an opening of the vehicle (e.g., between the doors and/or in an aperture of the door frame). Further, the object detection system may leverage a multiplane sensor system configured to detect the presence of objects in at least two planes of an opening of the vehicle (e.g., a first or "external" plane defined by a space between the doors of the vehicle when in an at least partially opened condition, and a second or "internal" plane defined by an aperture of the door frame), and determine optimal responses for the vehicle doors based on the presence and location of the object(s). Technical solutions discussed herein solve one or more technical problems associated with conventional sensor systems resulting in delayed, inaccurate, and/or insufficient door responses.

A vehicle according to examples of this disclosure may include one or more doors configured to open and close. The doors may be used and/or opened to provide ingress to and/or egress from the vehicle. In some examples, the vehicle may include one or more doors on one or both sides of the vehicle. For instance, in one particular example, a vehicle may have a door aperture on each side of the vehicle, and two doors may be disposed in each door aperture, for a total of four doors. In some examples, each door may be independently operable, while in some examples each pair of doors may be operated in concert. The doors may operate in a variety of operating states, such as a closed state, an opened state, a closing state, an opening state, or a partially open state. In some instances, the location, direction, and/or type of movement (e.g., velocity, acceleration, etc.) of the doors may differ based on the state of the doors. For example, a door in a closed state May be flush or substantially coplanar with the side of the vehicle with limited, if any movement. A door in an opened state may be fully opened and located outwards and away from the side of the vehicle with limited, if any movement. A door in an opening state may be located anywhere between the closed state and the opened state and moving in a direction to be fully opened. A door in a closing state may be located anywhere between the closed state and the opened state and moving in a direction to be flush with the side of the vehicle. A door in a partially open state may be located anywhere between the closed state and the opened state and may be stationary. An example of a partially opened state may be when the vehicle controls the doors to stop their motion in order to avoid pinching or bumping into an object. In some examples, the object detection system and/or any other component may cause the door(s) to transition (e.g., move) between the various states.

In some examples, the doors may move in a non-linear fashion along non-linear paths. For example, when the doors are opening or closing, such doors may move along a two- or three-dimensional path. In such examples, a side of the vehicle may include two laterally adjacent doors and when instructed, such doors may move in a direction substantially outwards and away from the vehicle, in addition to moving along linear paths parallel to the side of the vehicle in opposite directions. In some examples, the doors may be controlled in concert and/or independent of the states of the other doors. For example, the doors may perform the same or similar movement (e.g., action). Alternatively, or additionally, such doors may perform different movements.

In some examples, a door may have multiple emitting and receiving sensor devices mounted or installed at different locations along the inside edge (e.g., relative to opening created for ingress and egress) of the door. Such sensor devices may be oriented in a substantially horizontal (e.g., or angled) direction and, as such, may be configured to capture sensor data representing the region between the doors.

In some examples, the emitter(s) and/or receiver(s) of a first door may be paired with emitter(s) and/or receiver(s) of a second door. For example, the vehicle may have a first door and a second door that are laterally adjacent to one another while such doors are in a closed state. As described, when the first and second doors transition to an opening state, such doors may move laterally outward from the vehicle and then move substantially parallel to a side of the vehicle in opposite directions from one other, such that an opening is created between the first and second doors. In such instances, the first door and the second door may have inside edges that are oriented towards one another (e.g., may touch while in a closed state). The first door may have emitting sensor devices that emit signals to receiving sensor devices of the second door and/or may have receiving sensor devices that receive signals emitted from emitting sensor devices of the second door. Further, the emitting and/or receiving sensor devices may emit and receive signals while the doors are in any state, not solely while in a fully open state. Alternatively, or additionally, the doors may have one or more reflective plates disposed in the inside edge of the doors. In such instances, the doors may include sensor devices that operate as emitting and receiving devices. Such sensor devices may emit a signal from a first door to the reflective plane, at which point the signal may reflect from the reflective plate and return to the sensor device located on the inside edge of the first door. However, this is not intended to be limiting, the doors may include a combination of sensor devices and/or reflective surfaces.

In some examples, the beams emitted by the sensor devices located in the doors may create one or more planes. The plane(s) may represent a region of the environment within which the sensors may detect objects. In some examples, the plane may be a vertical plane that is located in-line with the emitting and/or receiving sensor devices disposed in the first door and/or the second door. The size and/or shape of the plane(s) may be based on the size of the doors, number and placement of sensor devices used, types of sensor devices, and/or the state of the doors. For instance, the height of the plane(s) may be based on the height of the doors and/or the proximity to the top of the doors at which emitting and/or receiving sensors are located. The width of the plane may be based on the distance between the inside edges of the doors while in a non-closed state. In some examples, depending on the characteristics (e.g., beam size) and placement of sensor devices used, the sensor devices located in the doors may be configured to detect objects within a threshold distance inboard or outboard of the plane.

In some examples, the dimensions and/or location of the plane may change as the door state changes. For example, as the doors are in the process of opening or closing, the plane may change in a variety of ways, such as the location, the size, and/or the shape of the plane. In such instances, when the doors begin to open, the doors may extend away from the vehicle in addition to moving in opposite directions from one another. As the two doors begin to move away from one another, the width of the plane may grow (e.g., the distance between the inside edges of the doors is growing). Further, the location of the plane may change based on the doors extending away from the vehicle. Additionally, or alternatively, the plane may change when the doors are in closing state as well. In some examples, the object detecting system may detect objects that intersect the plane.

In some examples, the vehicle may have a door frame configured to receive and/or support the door(s) while in a closed state. The door frame may outline an opening (e.g., door aperture) created by the doors when such doors move to an opened state. In some examples, the door aperture may define a plane that is flush or substantially aligned with the side of the vehicle. In some examples, the door aperture may define a plane that is parallel to and offset from the side of the vehicle. In such instances, occupants (or potential occupants) may utilize the door aperture to enter and/or exit the vehicle.

In some examples, the door frame may have multiple emitting and/or receiving sensor devices mounted or installed at different locations along the roof, floor, and/or side portions of the door frame. The emitting and/or receiving sensor devices may be oriented substantially vertically (in the case of roof and/or floor mounted sensor devices) and/or horizontally (in the case of side mounted sensor devices) and, as such, may be configured to capture sensor data representing the region within the door aperture. In some examples, the sensor devices in the door frame may be disposed inboard of the side of the vehicle to define a plane in the door aperture that is offset inboard of the side of the vehicle such that it is unobstructed by the doors when the doors are in the closed position. In such examples, the sensor devices in the door frame may be configured to detect objects that are resting against or proximate the interior of the doors.

In some examples, the emitting and receiving sensors located on the roof portion of the door frame may be paired with emitting and/or receiving sensor devices on the floor portion of the door frame. For example, an emitter located on the roof portion of the door frame may emit a signal to a receiving sensor device located on the floor portion of the door frame. Further, an emitter located on the floor of the door frame may emit a signal to a receiver located on the roof of the door frame. Alternatively, or additionally, the door frame may have a reflective plate coupled to the floor portion of the door frame. In such instances, the roof portion of the door frame may include sensor devices that operate as emitting and receiving devices. Such sensor devices may emit a signal from the roof portion to the reflective plate, at which point the signal may reflect from the reflective plate and return to the sensor device located on the roof portion of the door frame. However, this example is not intended to be limiting, in other examples the floor portion may include a combination of sensor devices and/or reflective surfaces. Further, in other examples, the door frame may have one or more emitting and/or receiving sensor devices disposed on one or more vertical walls of the door frame. Such emitting and/or receiving sensor devices may be configured to emit and/or receive signals horizontally.

In some examples, the sensor devices located in the door frame may create one or more planes (e.g., a second plane). The second plane may represent a region of the environment within which the sensors may detect objects. The second plane may be a stationary, vertical plane that is located in-line with, or parallel to and offset from, the side of the vehicle. As such, the second plane (e.g., defined by the emitting and/or receiving sensor devices located in the door frame) may be interior (e.g., internal) to the first plane (e.g., defined by the emitting and/or receiving sensors disposed in the doors; external plane) relative to the vehicle at least when the doors in a non-closed state. In some examples, the size of the second plane may be defined by height and width of the door aperture.

In some examples, the object detection system may use the sensor devices located in the doors and/or the door frame to detect objects between the doors and/or within the door aperture. The object detection system may capture sensor data while the doors are in any state. As such, the object detection system may receive sensor data from the sensor devices while the doors are fully open or partially open. The object detection system may analyze the sensor data to detect objects that intersect the first and/or second planes. Along with determining that an object is intersecting the first and/or second planes, the object detection system may identify and/or receive the location of the intersection, the size of the object, a timestamp of when the object intersected the first and/or second planes, and/or other information.

In some examples, the object detection system may determine a state of the door(s). The object detection system may determine whether each of the doors are in an opened state, a closed state, an opening state, or a closing state. The object detection system may receive and/or request such information from one or more vehicle databases. The state of the door(s) may impact the action provided to the doors.

In some examples, the object detection system may determine zone characteristics associated with one or more portions of a region between the doors when in other than the closed state. A zone characteristic may affect the speed in determining an action for the door(s) and/or the type of action provided to the door(s). The zone characteristic may be determined based on the location at which the object intersects the first and/or second planes. In some examples, the object detection system may operate in accordance with a zoning scheme which may include a number of zones of different dimensions and locations. In some instances, each zone may be associated with a particular level which may correlate to a zone characteristic. In some examples, the object detection system may determine the dimensions and/or locations of the zones based on various factors, such as the state of the doors, the distance between the doors, the speed at which the doors are moving, and/or any other factor. In some examples, the object detection system may employ a single zone scheme covering both planes. Alternatively, the object detection system may employ different zone schemes for the first plane and the second plane, respectively. In some instances, the object detection system may determine whether to use the zoning scheme of the first plane or the zoning scheme of the second plane based on determining the state of the doors and/or determining whether occupants (or potential occupants) are entering (e.g., use the zoning scheme of the exterior plane) or exiting (e.g., use the zoning scheme of the interior plane) the vehicle. However, this is not intended to be limiting, the object detection system may determine which zoning scheme to use in a variety of different ways. In some examples, the object detection system may determine a different door response based on the zone characteristic. In some examples, the object detection system may determine a different door response based on the type of object. Further, the dimensions and/or locations of the zones may be modified based the state of the doors, the mode of the vehicle, the state of the occupants, the state of the potential occupants, etc.

In some examples, the object detection system may determine one or more actions for the door(s). The object detection system may determine the action for the doors based on evaluating the state of the doors and/or the zoning characteristics associated with detected object. The object detection system may determine the same or similar actions for some or all doors. Alternatively, the object detection system may determine a different action for some or all doors. In some examples, the actions may include instructing the doors to change directions and/or change speeds. For example, the instructions may include instructing the doors to move to an opened state, to stop all movement, and/or to move to a closed state. In some examples, the object detection system may control the movement of the doors based on the determined action(s).

As illustrated by these examples, the techniques described herein can improve the functioning, safety, and efficiency of the autonomous and semi-autonomous vehicles operating in various driving environments by using the multiplane sensor system to detect objects more efficiently and accurately. The sensor system described herein may improve the vehicle safety and efficiency by improving the accuracy of object detection based on employing a multiplane sensor system to provide a robust coverage of the regions between the doors and/or within the door aperture. The improved object detection by the multiplane sensor system can be used to more efficiently and accurately determine what type(s) of door actions may be used to ensure that the doors do not close (or continue to close) on the detected object. The features and functionality described herein thus improve vehicle safety by preventing doors from closing on occupants and/or other objects, while also avoiding suboptimal door actions caused by using a general door response for detected objects.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or robotic platform), and are not limited to autonomous vehicles. In one example, similar techniques may be utilized in driver-controlled vehicles in which such a system may provide an indication of whether it is safe to perform various maneuvers. Also, the techniques are applicable to any shape, size, and modality of vehicle, such as cars, trucks, vans, busses, trains, boats, ships, aerial vehicles, etc. In still other examples, any or all of the techniques described herein may be implemented in a building or other structure that includes a door for entry or exit.

FIG. 1 is a pictorial flow diagram illustrating an example process 100 for detecting an object between doors of a vehicle and/or in a door aperture o the vehicle, determining an action for the door(s), and controlling the doors based on the action. In various examples, some or all of the operations in process 100 may be performed by an object detection system associated with a perception component, a prediction component, a planning component, and/or other components and systems within an autonomous vehicle. For instance, as shown in this example, process 100 may be implemented using an object detection system 102. As described below in more detail, the object detection system 102 may include various components, such as an object detecting component, a zone component, a door state component, and/or a door movement component, which may be configured to detect objects, determine optimal door responses, and/or control the doors based on the responses.

At operation 104, the object detection system 102 may receive sensor data collected by one or more emitting and/or receiving devices of the autonomous vehicle. In some examples, a vehicle may have multiple emitting and/or receiving devices mounted at various locations configured to capture sensor data of the regions between the doors and/or within a door aperture. For example, box 106 illustrates an autonomous vehicle 108 capturing sensor data of the region between the open doors. In this example, the autonomous vehicle 108 may include a first door 110 and a second door 112. As shown, the first door 110 and the second door 112 may be in an opened state; however, in other examples the doors may be in a closed state, an opening state, a closing state, or any other state.

In some examples, the first door 110 and the second door 112 may have a plurality of emitting and/or receiving sensor devices. In some examples, the sensor devices may be located anywhere along the inside edge of the first door 110 and the second door 112. Further, the doors may include any number of sensor devices. As shown in box 106, the first door 110 may have four emitting sensors that are oriented in a horizontal direction and the second door 112 may have three emitting sensors that are oriented in a horizontal direction configured to capture sensor data of the region between the first door 110 and the second door 112; however, in other examples, the first door 110 and/or the second door 112 may have more or less emitting sensors.

In some examples, the sensor devices of the first door 110 and the second door 112 may be paired. For example, an emitter located in the inside edge of the first door 110 may be paired with a receiver located in the inside edge of the second door 112. Further, a receiver of the first door 110 may be paired with an emitter of the second door 112. However, this example is not intended to be limiting, an emitter may be paired with multiple receivers, and a receiver may be paired with multiple emitters.

In some examples, the sensor devices of the first door 110 and the second door 112 may establish a first plane. The first plane may be the region within which the sensor devices of the first door 110 and the second door 112 may detect objects. As shown in box 106, the sensor devices of the first and second doors are oriented horizontally to the region between the doors. The height of the plane may be based on the location of the highest and lowest emitting and/or receiving sensor devices. For example, as shown in box 106, the top of the first plane may be the height of the sensor device that is the highest in either door. In this instance, the top of the first plane may be the height of the top emitter of the first door 110. Further, the bottom of the first plane may be the height of the bottom emitter of the first door 110. The width of the plane may be based on the distance between the first door 110 and the second door 112. As such, the plane may extend from the inside edge of the first door 110 to the inside edge of the second door 112.

In this example, the vehicle 108 may include a door frame. The door frame may outline a door aperture created by the first door 110 and the second door 112 when such doors are in a non-closed state. Further, the door frame may include a roof 114 portion and a floor 116 portion. The door frame may have any number of sensor devices located at anywhere along the inside edge of the roof 114 and/or the floor 116. Further, the door frame may have any number of emitting and/or receiving sensor devices located on any side (e.g., the top, the bottom, the left side, the right side) of the door frame. For example, the box 106 illustrates the roof 114 having three emitting sensor devices that may be oriented to emit signals in a vertical direction, while illustrates the floor 116 having two emitting sensor devices that may be oriented to emit signals in a vertical direction. However, this example is not intended to be limiting, the roof 114 and/or floor 116 may have more or less emitting and/or receiving sensor devices. In some examples, the sensor devices of the roof 114 and the floor 116 may be configured to capture sensor data representing the region within the door aperture.

In some examples, the sensor devices of the roof 114 maybe paired with the sensor devices of the floor 116. For example, an emitter located in the roof 114 portion of the door frame may be paired with a receiver located in the floor 116 portion of the door frame. Further, a receiver of the roof 114 may be paired with an emitter of the floor 116. However, this example is not intended to be limiting, an emitter may be paired with multiple receiving devices, and a receiving device may be paired with multiple emitters.

In some examples, the sensor devices of the roof 114 and the floor 116 of the door frame may establish a second plane. The second plane may represent a region within the door aperture (e.g., defined by the door frame) within which the sensor devices of the roof 114 and the floor 116 may detect objects. Based on the sensor devices of the door frame being mounted and/or located in stationary locations, the second plane may be a stationary plane that is internal (e.g., relative to the vehicle 108) to the first plane (e.g., external plane). The height and width of the second plane is based on the locations of the sensor devices and/or the doors.

As such, in some examples, the object detection system 102 may receive and/or utilize the sensor devices located in the first door 110, the second door 112, the roof 114, and/or the floor 116. For example, the object detection system 102 may receive sensor data associated with the first plane (e.g., between the first door 110 and the second door 112) and the second plane (e.g., within the door aperture).

At operation 118, the object detection system 102 may detect an object based on the sensor data. In some examples, the object detection system 102 may use the sensor data captured at operation 104 to detect objects between the doors and/or within the door aperture. Specifically, the object detection system 102 may analyze the sensor data to detect objects that intersect the first and/or second planes, as described above. An object intersects a plane if the object obstructs the path of a signal being sent from an emitter to a receiver. For example, box 120 illustrates sensors of the vehicle 108 capturing sensor data of an object 122 entering the vehicle 108. In this example, the object 122 is a human (e.g., occupant, potential occupant, customer, consumer, etc.); however, in other examples the object 122 may be a trash, backpack, luggage, food, pets, animals, and/or any other object. Upon detecting the object 122, the object detection system 102 may receive and/or identify a location at which the object 122 intersected the first and/or second planes, the size of the object 122, the velocity of the object 122 intersecting the first and/or second planes, a timestamp indicating when the object 122 intersected the first and/or second planes, and/or any other information. In such instances, the object detection system 102 may weight such information when determining the type of response for the first and second doors. For instance, the object detection system 102 may use the timestamp information to determine whether the object 122 is entering or exiting the vehicle 108 (e.g., based on which time occurs first). Further, the vehicle may use such information to determine whether to use a zoning scheme associated with the first plane and/or second plane. Further, when determining an action for the first and/or second doors, the object detection system 102 may consider whether the object 122 is entering or exiting the vehicle 108 (e.g., close doors quickly if occupant is exiting; close doors slowly if occupant is entering). In this example, the object detection system 102 may use the timestamp information to determine that the object 122 is entering the vehicle 108. The object detection system 102 may make such a determination based on the object 122 intersected the first plane prior to the second plane.

At operation 124, the object detection system 102 may determine a state of the door(s) and a zone associated with the object 122 intersecting the planes. The object detection system 102 may determine whether the first door 110 and the second door 112 are in an opened state, a closed state, an opening state, or a closing state. As illustrated in box 126, the object detection system 102 may determine that the first door 110 is in an opened state, as the first door 110 is fully open. Further, the object detection system 102 may determine that the second door 112 is in an opened state, as the second door 112 is fully open. In some examples, the object detection system 102 may also determine the zone characteristic associated with the intersecting object 122. A zone characteristic may be associated with one or more types of actions which may indicate the degree of importance regarding the event of intersecting the planes. In some instances, the zone characteristic can be determined based on the location at which the object intersects the first and/or second planes. For example, box 126 illustrates a number of zones 128 located between the doors and/or within the door aperture of the vehicle 108. In this example, each zone 128 may be associated with a particular zone characteristic. The object detection system 102 may determine the zone characteristic based on comparing the location of the object with the various zones 128. Alternatively, or additionally, if the object location is associated with multiple zones, the object detection system 102 may select or otherwise determine the zone characteristic of the zone with highest level of the multiple zones. In this example, the object 122 locations intersect multiple zones 128. As such, based on the location of the object being associated with level "1" and level "2" zones, the object detection system 102 may determine that the zone is "1."

At operation 130, the object detection system 102 may control the door(s) based on the state of the door(s) and/or the zone characteristics of the intersecting object. In some examples, the object detection system 102 may determine one or more actions for the door(s). In such instances, the object detection system 102 may determine independent actions for some or all doors. When determining which action to employ, the object detection system 102 may weigh the state of the doors and/or the zone characteristics. For example, box 132 illustrates the first door 110 and the second door 112 transitioning its doors to a fully opened state.

Figure 2:
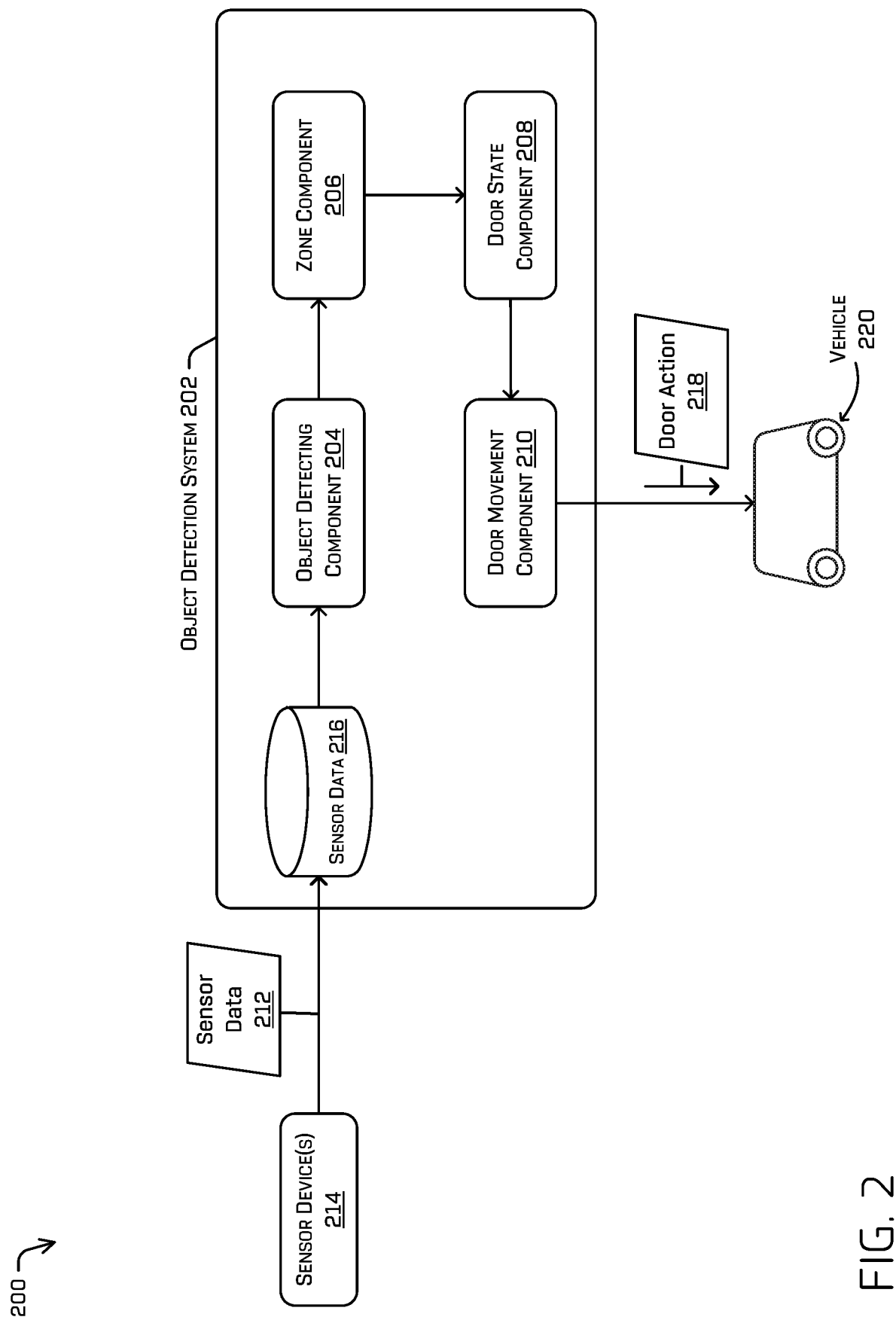
FIG. 2 illustrates an example computing system including an object detection system configured to detect objects and determine door responses, in accordance with one or more examples of the disclosure.

FIG. 2 illustrates an example computing system including an object detection system 202, configured to detect objects and determine door responses.

In some examples, the object detection system 202 may be similar or identical to the object detection system 102 described above, or in any other examples herein. As noted above, in some cases the object detection system 202 may be implemented within or otherwise associated with a perception component, a prediction component, and/or a planning component of an autonomous vehicle. In some examples, the object detection system 202 may include various components, described below, configured to perform different functionalities of a multiplane object detecting technique. In some examples, the object detection system 202 may include an object detecting component 204 configured to detect objects between the vehicle doors and/or within a door aperture. Additionally, the object detection system 202 may include a zone component 206 configured to determine the zone characteristics associated with the detected object, a door state component 208 configured to determine the state of the doors, and/or a door movement component 210 configured to determine the response and/or action for the doors.

In some examples, the object detection system 202 may receive sensor data 212 from one or more sensor device(s) 214 within (or otherwise associated with) the autonomous vehicle. Different sensor device(s) 214 (e.g., infrared, lidar, radar, time-of-flight, etc.) may be mounted or installed at different locations on the autonomous vehicle providing various types of sensor data to the object detection system 202. For example, the sensor device(s) 214 may be mounted or installed in the inside edges of the door(s) and/or door frame. As shown in this example, the object detection system 202 may include a sensor data component 216 to receive, store, synchronize, and/or analyze particular sensor data received from the sensor device(s) 214.

In some examples, the object detection system 202 may include a sensor data component 216 configured to store and/or synchronize sensor data received by the sensor device(s) 214. In some examples, the sensor data component 216 may include parameters of sensor data corresponding to the type of sensor device 214 that is used.

As noted above, the object detection system 202 may include an object detecting component 204 configured to analyze sensor data 212 and detect objects. The object detecting component 204 may evaluate the sensor data 212 received from the sensor data component 216. In some examples, the object detecting component 204 may detect an object based on determining that the signal sent from the sensor devices 214 of the doors or door frame to the receiver has been obstructed. Upon detecting an object, the object detecting component 204 may identify and/or determine a location at which the object intersected the first and/or second planes, a size of the object, a timestamp indicating when the object intersected the first and/or second planes, and/or any other information. The object detecting component 204 may determine the location at which the object intersected the first and/or second planes by determining which sensor devices indicate the obstruction. For example, the sensor devices located in the door and the door frame create a grid-like locating system. In such instances, the object detecting component 204 may identify which sensor devices of the doors are obstructed. Such information may provide a latitudinal offset location. Further, the object detecting component 204 may identify which sensor devices of the door frame are obstructed, which may provide a longitudinal offset location. Using the combination of the longitudinal and/or lateral offset locations (relative to a central point of the door opening), the object detecting component 204 may identify the location of the object(s). In some examples, the object detecting component 204 may send such information to the zone component 206.

In some examples, the object detection system 202 may include a zone component 206 configured to determine the zone characteristic associated with the detected object. The zone component 206 may evaluate the information received from the object detecting component 204. The zone component 206 may determine the degree of importance associated with the detected object. Such a determination may be based on the location of the object intersecting the first and/or second plane(s) determined by the object detection component 204. In some examples, the zone component 206 may determine and/or employ one or more zoning schemes for the first plane, the second plane, and/or a combination of the two. A zoning scheme may include a group of regions having different dimensions and locations that are associated with different characteristics (e.g., action types and/or speeds). In some examples, higher zone levels and/or characteristics may cause the object detection system 202 to react and/or determine actions that respond at higher speeds compared to lower levels. In some examples, the zone component 206 may assign regions proximate to the doors to have higher levels and/or characteristics, since such regions create a heightened risk to the occupants. For example, the zone component 206 may determine a tall, rectangular zone with a high level that is adjacent to the door. However, this example is not intended to be limiting, other examples may include more or less zones of differing dimensions and/or locations.

In some examples, the zone component 206 may modify the zoning scheme based on the doors changing states. For example, the zone component 206 may determine a zoning scheme as the doors are opening or when the doors are in a fully opened state. In such instances, the zoning scheme may cover the same or similar dimensions as the first and/or second planes. In such examples, when a door transitions to a closing state and the doors begin to close, the opening (e.g., distance between the doors) between the doors begins to get smaller. In such instances, the zone component 206 may periodically (e.g., continuously, when the doors move a threshold distance, etc.) modify the zoning scheme as the doors close. The zone component 206 may modify the zoning scheme by changing the shape, dimensions, and/or locations or the zones.

Based on determining the zoning scheme, the zone component 206 may determine within which zone the object is located. To determine which zone the object intersected, the zone component 206 may use the location information determined by the object detecting component 204 and compare the known location of the intersection with the various zones. Upon identifying within which zone the object is located, the zone component 206 may send such information to the door state component 208 and/or the door movement component 210. Alternatively, or additionally, in some instances the zone component 206 may determine that the object intersected multiple zones. In such cases, the zone component 206 may identify the various zones and based on comparing the levels of the various zones, the zone component 206 may determine the zone characteristic based on the zone with the highest level.

In some examples, the object detection system 202 may include a door state component 208 configured to determine the state of the doors. The door state component 208 may evaluate the state of some or all doors. In some examples, the door state component 208 and/or any other component may store a current state for each door of the vehicle. Accordingly, upon detecting an object, the door state component 208 may access such information to determine whether the doors are in an opened state, a closed state, an opening state, or a closing state. The door state component 208 may send such information to the door movement component 210.

In some examples, the object detection system 202 may include a door movement component 210 configured to determine the response and/or action for the doors. The door movement component 210 may determine one or more door actions 218 based on evaluating the zone characteristic of the object detection, the door state, and/or any other information (e.g., timestamp information). The door movement component 210 may determine an independent action for some or all of the doors of the vehicle. In some cases, the door actions 218 may include instructing the doors to move to an opened state, to stop all movement (e.g., beneficial when the object is proximate the hinges of the doors), and/or to move to a closed state. In some examples, the door movement component 210 may send the door action 218 to the vehicle 220.

As shown in this example, the object detection system 202 may send the door actions 218 for further use. In such examples, based on the object detection system 202 having determine one or more actions 218 for the one or more doors, the object detection system 202 may send the one or more actions 218 to the vehicle 220. The vehicle 220 may cause the one or more doors to follow the one or more actions 218.

Figure 3:
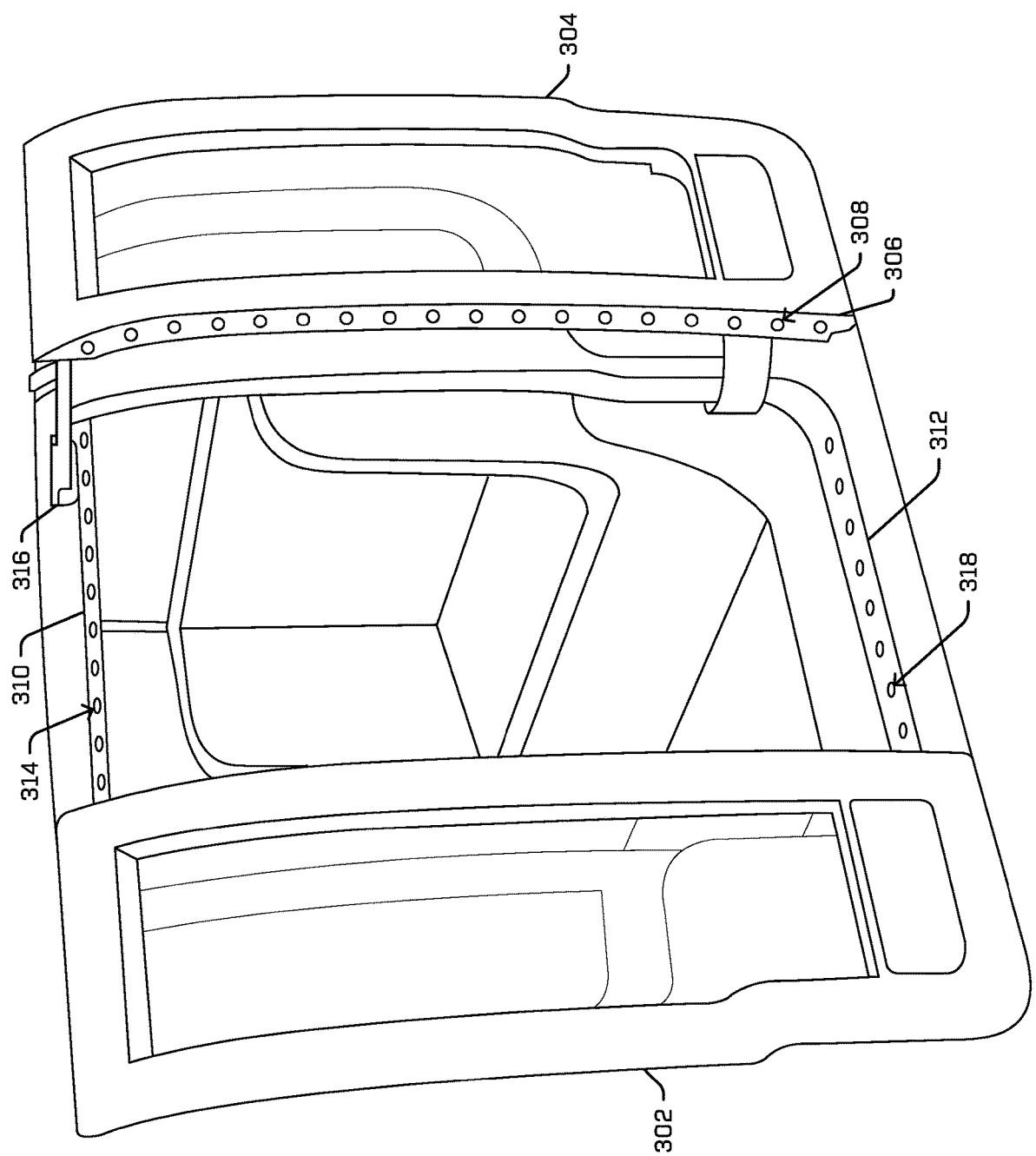
FIG. 3 illustrates a perspective view of an example sensor system of a vehicle configured to detect objects, in accordance with one or more examples of the disclosure.

FIG. 3 illustrates a perspective view of an example sensor system 300 of a vehicle configured to detect objects. Specifically, FIG. 3 describes a multiplane sensor system configured to detect objects between the vehicle doors and/or within the door aperture.

In this example, the sensor system 300 of the vehicle may be similar or identical to the sensor system described in FIGS. 1 and 2. In some examples, the vehicle may include a first door 302 and a second door 304. The first door 302 and the second door 304 may be in a fully opened state. In some examples, the second door 304 may include an inside edge 306 which is directed towards the first door 302. Though not shown in FIG. 3, the first door 302 also includes an inside edge. In this example, the inside edge 306 of the second door 304 may include multiple sensor devices 308 (e.g., emitting and/or receiving). The sensor devices 308 may be located anywhere along the inside edge 306 of the first door 302. Further, the inside edge 306 may include any number (e.g., two, ten, twenty, forty, etc.) of sensors devices 308. In some examples, the sensor devices 308 may be emitting and/or receiving devices arranged and/or ordered in any order or arrangement. For example, the sensor devices 308 may alternate between emitting devices and receiving devices along the inside edge 306. However, this is not intended to be limiting, in other examples the sensor devices 308 may be ordered differently. Though not shown in FIG. 3, the first door 302 may have a similar arrangement of sensor devices.

In some examples, the sensor devices 308 of the second door 304 may be paired with the sensor devices of the first door 302. For example, an emitter of the second door 304 may emit a signal to a receiver of the first door 302, and a receiver of the second door 304 may receive a signal from an emitter of the first door 302.

In this example, the vehicle may include a door frame with a roof portion 310 and a floor portion 312. The door frame may outline a door aperture through which occupants may enter or exit the vehicle. The door aperture may be in-line with the side of the vehicle. In some examples, the roof portion 310 may have multiple sensor devices 314. In some examples, any number (e.g., two, ten, twenty, forty, etc.) of sensor devices 314 may be located anywhere along the inside edge of the roof portion 310 of the door frame. In such instances, the sensor devices 314 may be located proximate door hinges 316 in order to increase detection in such regions. As shown, the sensor devices 314 may be oriented vertically and may be configured to capture sensor data representing the door aperture. In some examples, the floor portion 312 may also include any number of sensor devices 318 located anywhere along the door frame. In some examples, the sensor devices 314 of the roof portion 310 may be paired with the sensor devices 318 of the floor portion 312. For example, an emitter of the roof portion 310 may emit a signal to a receiver of the floor portion 312, and a receiver of the roof portion 310 may receive a signal from an emitter of the floor portion 312.

Figure 4:
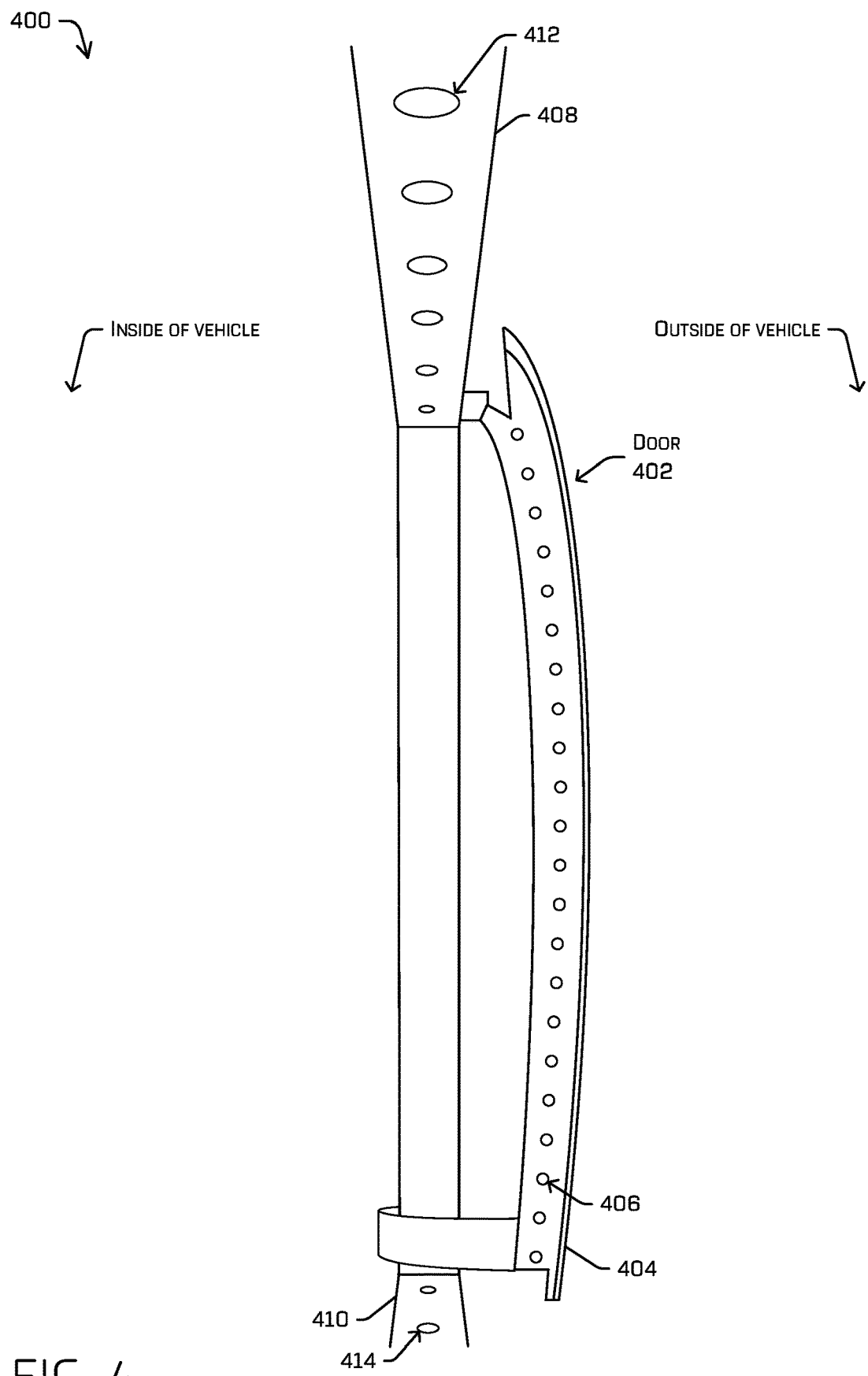
FIG. 4 illustrates a cross section view of an example sensor system of a vehicle configured to detect objects, in accordance with one or more examples of the disclosure.

FIG. 4 illustrates a cross section view of an example sensor system of a vehicle configured to detect objects. Specifically, FIG. 4 illustrates the two planes used to detect objects between the doors and/or within the door aperture.

In this example, the example sensor system 400 may be similar or identical to the sensor system described in FIGS. 1-3. In this example, the vehicle may have a door 402 which is represented in FIG. 4 in a fully opened state. The door 402 may have an inside edge 404 that is proximate a second door (e.g., not shown). In some instances, the inside edge 404 may have multiple sensor devices 406 which may be located anywhere along the inside edge 404 of the door 402. As described above, such sensor devices 406 may be paired with sensor devices of a second door. In such instances, the sensor devices 406 may establish a first plane that is in-line with the door. The first plane may be the region between the door 402 and the second door wherein objects may be detected.

In this example, the vehicle may have a door frame with a roof portion 408 and a floor portion 410. The roof portion 408 may have multiple sensor devices 412 that may be oriented vertically and paired with the sensor devices 414 of the floor portion 410. As described above, the sensor devices 412 and the sensor devices 414 may establish a second plane that is in-line (e.g., flush) with the door frame. The second plane may be a vertical plane that is parallel and interior (e.g., internal) to the first plane (e.g., created by the door 402; external plane). In some examples, the vehicle may detect objects that intersect the first plane (e.g., obstruct the sensor devices 406 of the door 402) and/or the second plane (e.g., obstruct the sensor devices 412 and the sensor devices 414 of the door frame).

Figure 5:
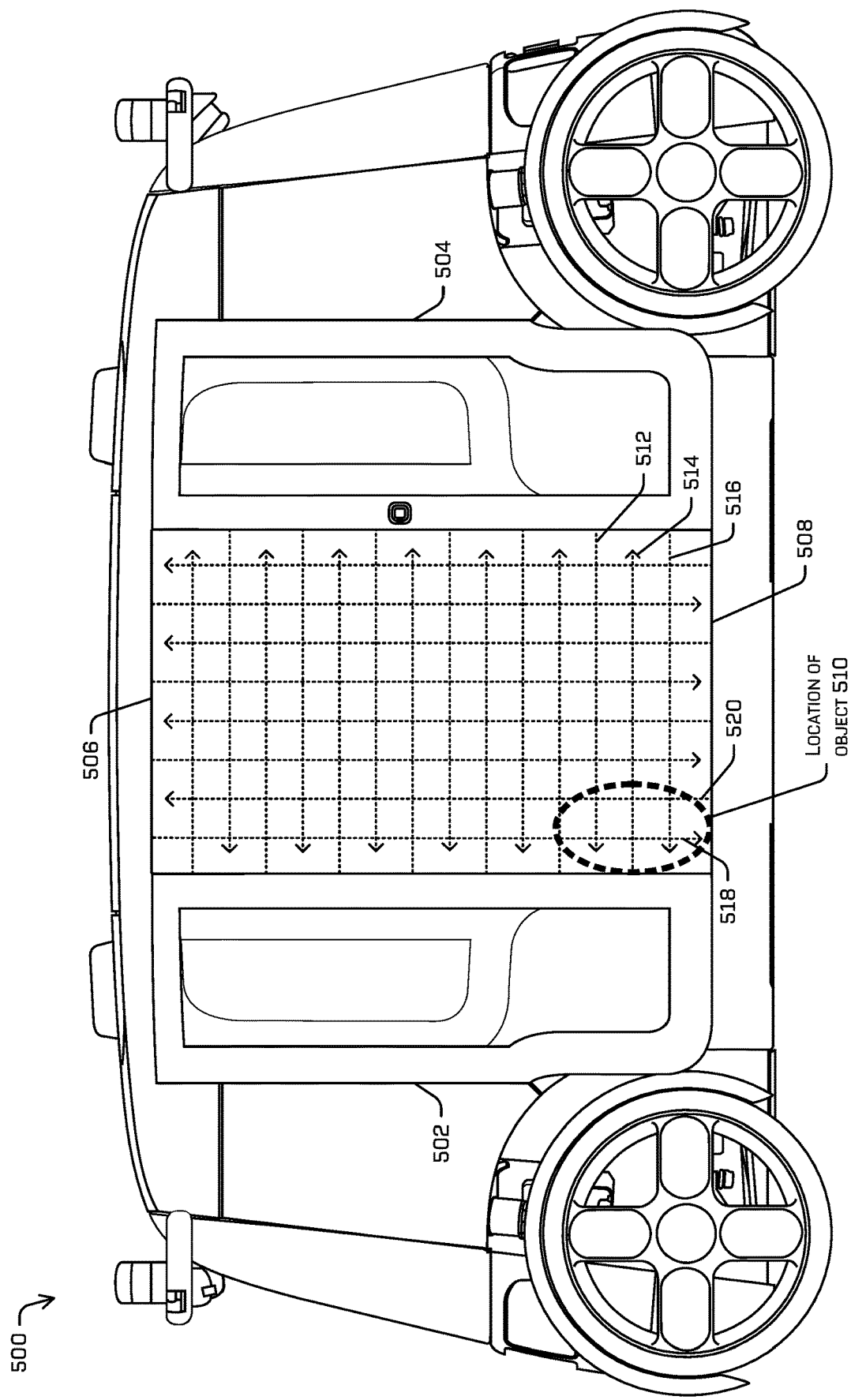
FIG. 5 illustrates an example vehicle depicting a matrix style sensor system, in accordance with one or more examples of the disclosure.

FIG. 5 illustrates an example vehicle depicting a matrix style sensor system 500. Specifically, FIG. 5 depicts an example which includes identifying the location an object that has intersected the first and/or second plane(s).

In this example, the sensor system 500 may be similar or identical to the sensor system described in FIGS. 1-4. In this example, the vehicle may have a first door 502, a second door 504, a roof portion 506, and a floor portion 508. The first door 502 and the second door 504 may have any number of emitting and/or receiving sensor devices oriented horizontally and configured to capture sensor data of the region between the between doors. Further, the roof portion 506 and the floor portion 508 of the door frame may also have any number of emitting and/or receiving sensor devices oriented vertically and configured to capture sensor data of the region within the door aperture. In this example, the vehicle may detect the location of an object 510 that has intersected the first and/or second plane(s). The vehicle may determine the location at which the object intersected the planes based on identifying which sensors indicate the obstruction caused by the object. For example, the vehicle may determine a lateral offset (e.g., relative to a central point between the doors) based on determining that the object obstructs the emitter/receiver pair 512, the emitter/receiver pair 514, and the emitter/receiver pair 516. Further, the vehicle may determine a longitudinal offset based on determining that the object obstructs the emitter/receiver pair 518 and the emitter/receiver pair 520. As such, based on such the longitudinal and lateral offsets, the vehicle may identify the location at which the object intersects the first and/or second planes. In some examples, the vehicle may use the location information when determining what action type to provide to the first door 502 and the second door 504.

Figure 6A:
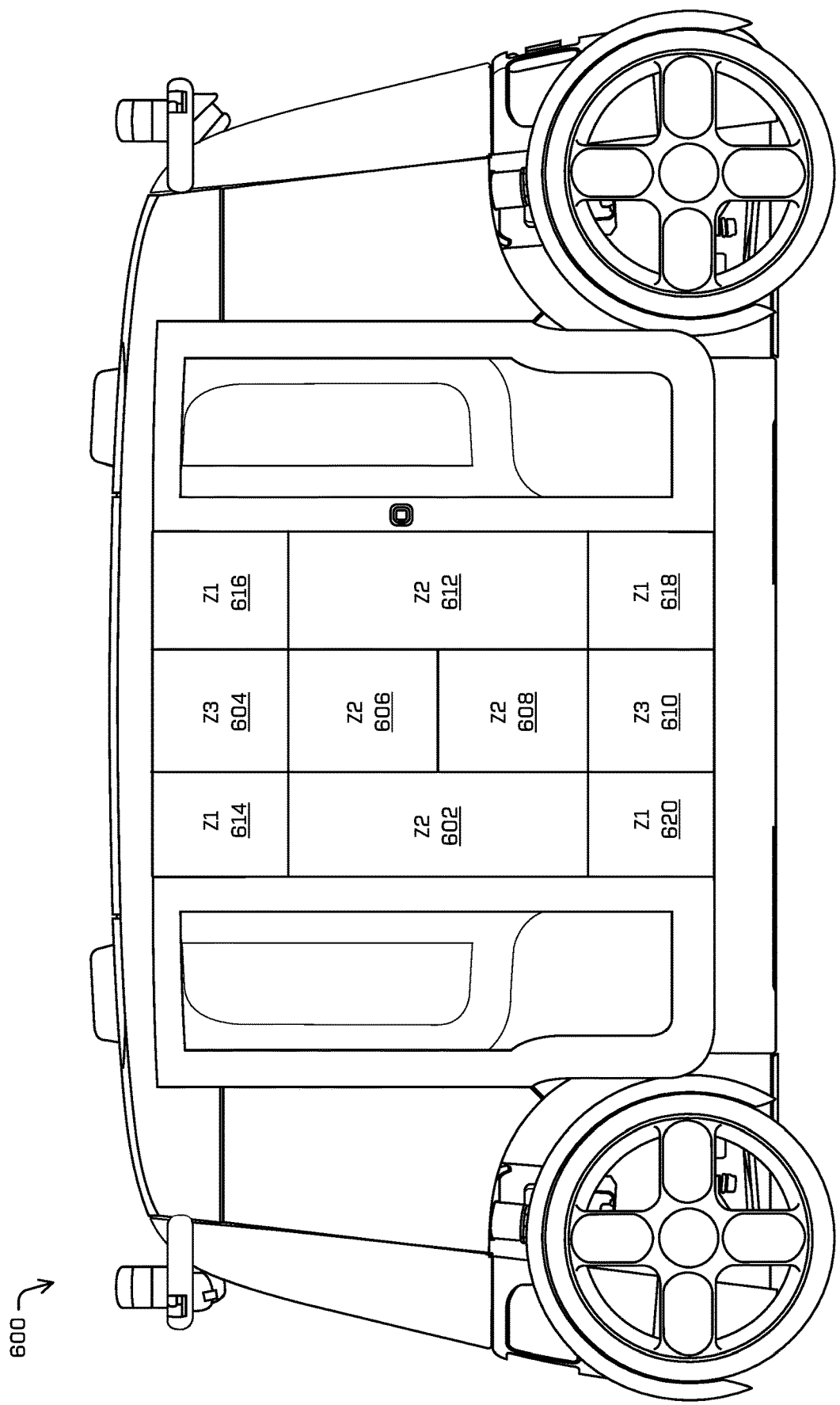
FIG. 6A illustrates an example of zones associated with a vehicle opening, in accordance with one or more examples of the disclosure.

FIG. 6A illustrates an example zoning scheme associated with a vehicle opening.

In this example, the example zones 600 may be similar or identical to the zones described in FIG. 1. In this example, the example zones 600 may have a zone 602, a zone 604, a zone 606, a zone 608, a zone 610, a zone 612, a zone 614, a zone 616, a zone 618, and a zone 620. In some examples, the vehicle may determine the various zones based on which zones of the opening are most important to provide heightened response (e.g., faster response, more sensitive, etc.). In this example, the zone 602 may have a level of "2," the zone 604 may have a level of "3," the zone 606 may have a level of "2," the zone 608 may have a level of "2," the zone 610 may have a level of "3," and the zone 612 may have a level of "2," the zone 614 may have a level of "1," the zone 616 may have a level of "1," the zone 618 may have a level of "1," and the zone 620 may have a level of "1." However, this example is not intended to be limiting, in other examples there may be more or less zones at higher or lower levels.

In some examples, the vehicle may identify a location at which an object intersects a first and/or second plane of sensors. Based on the identifying the location, the vehicle may compare the location with the example zones 600 to determine which zone level and/or characteristic to associate with the object intersection. If the object location is associated with multiple zones, the vehicle may select the highest level of the multiple zones.

Figure 6B:
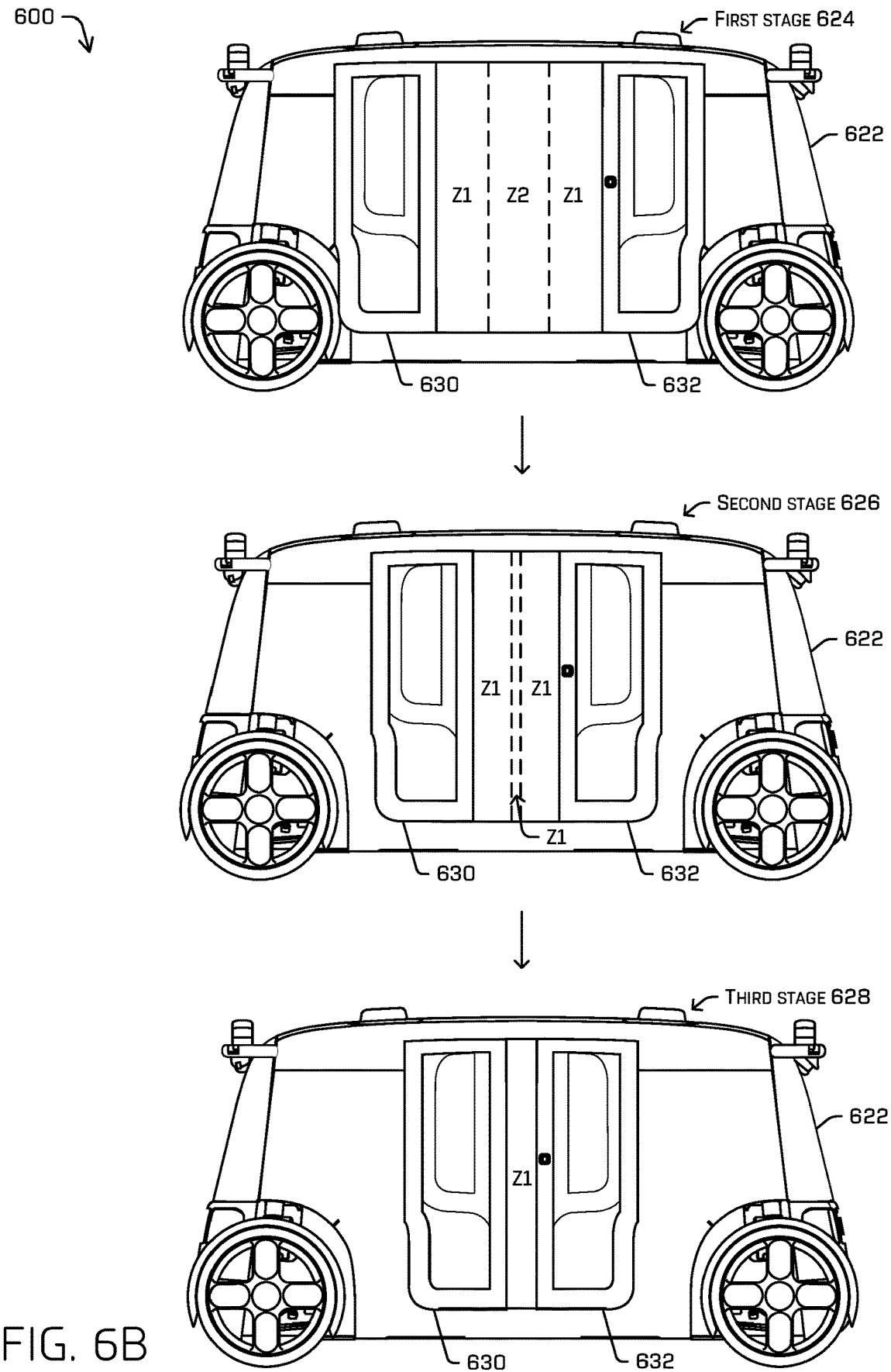
FIG. 6B illustrates an example of zones changing based on a distance between the doors, in accordance with one or more examples of the disclosure.

FIG. 6B illustrates an example zoning scheme changing based on the distance between the doors. Specifically, FIG. 6B illustrates how the zoning schemes may change and/or be modified based on the doors transitioning between states.

In this example, the example zones 600 may be similar or identical to the sensor system described in FIG. 1. This example illustrates a vehicle 622 at three different stages. The first stage 624 may include the vehicle 622 with fully open doors, the second stage 626 may include the vehicle 622 with partially opened doors (e.g., in the process of closing), and the third stage 628 may include the vehicle 622 with partially opened doors with a smaller opening than at the second stage 626. In this example, the vehicle 622 may include a first door 630 and a second door 632. At the first stage 624, the first door 630 and the second door 632 may be fully open. As shown at the first stage 624, the vehicle opening has three zones, two zones at level "1" and one zone at level "2." In some instances, as the first door 630 and the second door 632 transition to a closing state, the opening between the doors may decrease. For example, at the second stage 626, the opening between the first door 630 and the second door 632 is smaller. As such, the vehicle may modify the zones accordingly. As shown, in response to the doors closing, the vehicle 622 may decrease the width of the middle zone that has a level of "2." Further, as shown at the third stage 628, the vehicle may have further modified the zones based on the doors continuing to close. At the third stage 628, the vehicle may remove the middle zone and created a single zone.

Figure 7:
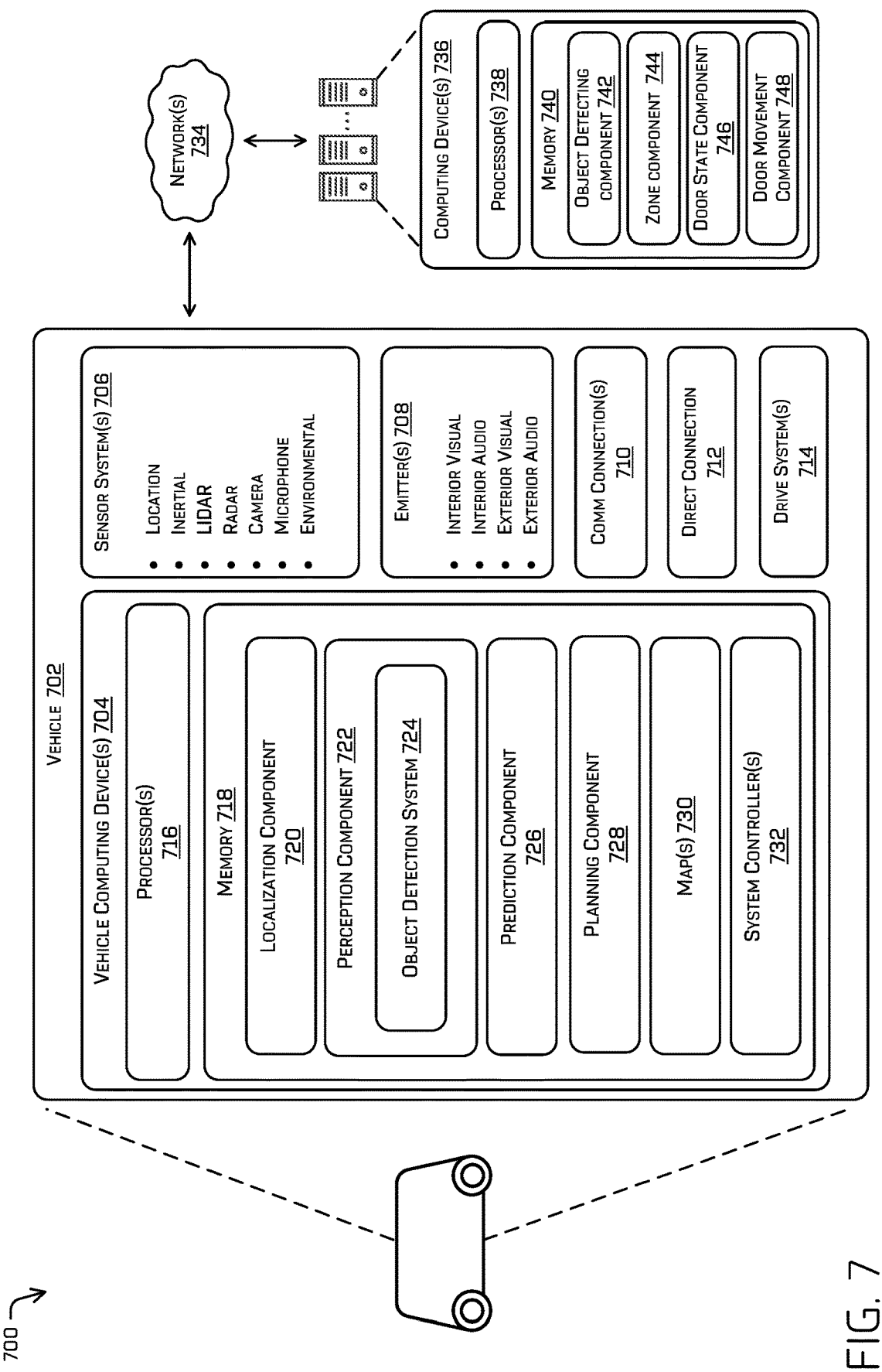
FIG. 7 depicts a block diagram of an example system for implementing various techniques described herein.

FIG. 7 is a block diagram of an example system 700 for implementing the techniques described herein. In at least one example, the system 700 may include a vehicle, such as vehicle 702. The vehicle 702 may include one or more vehicle computing devices 704, one or more sensor systems 706, one or more emitters 708, one or more communication connections 710, at least one direct connection 712, and one or more drive systems 714.

The vehicle computing device 704 may include one or more processors 716 and memory 718 communicatively coupled with the processor(s) 716. In the illustrated example, the vehicle 702 is an autonomous vehicle; however, the vehicle 702 could be any other type of vehicle, such as a semi-autonomous vehicle, or any other system having at least an image capture device (e.g., a camera-enabled smartphone). In some instances, the autonomous vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 702 may be a fully or partially autonomous vehicle having any other level or classification.

In the illustrated example, the memory 718 of the vehicle computing device 704 stores a localization component 720, a perception component 722 including an object detection system 724, a prediction component 726, a planner component 728, one or more system controllers 732, and one or more maps 730 (or map data). Though depicted in FIG. 7 as residing in the memory 718 for illustrative purposes, it is contemplated that the localization component 720, the perception component 722 including the one or more object detection system(s) 724, the prediction component 726, the planner component 728, system controller(s) 732, and/or the map(s) may additionally, or alternatively, be accessible to the vehicle 702 (e.g., stored on, or otherwise accessible by, memory remote from the vehicle 702, such as, for example, on memory 740 of one or more computing device 736). In some examples, the memory 740 may include an object detecting component 742, a zone component 744, a door state component 746, and/or a door movement component 748.

In at least one example, the localization component 720 may include functionality to receive sensor data from the sensor system(s) 706 to determine a position and/or orientation of the vehicle 702 (e.g., one or more of an x-, y-, z-position, roll, pitch, or yaw). For example, the localization component 720 may include and/or request/receive a map of an environment, such as from map(s) 730, and may continuously determine a location and/or orientation of the vehicle 702 within the environment. In some instances, the localization component 720 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 702. In some instances, the localization component 720 may provide data to various components of the vehicle 702 to determine an initial position of the vehicle 702 for determining the relevance of an object to the vehicle 702, as discussed herein.

In some instances, the perception component 722 may include functionality to perform object detection, segmentation, and/or classification. In some examples, the perception component 722 may provide processed sensor data that indicates a presence of an object (e.g., entity) that is proximate to the vehicle 702 and/or a classification of the object as an object type (e.g., car, pedestrian, cyclist, animal, building, tree, road surface, curb, sidewalk, unknown, etc.). In some examples, the perception component 722 may provide processed sensor data that indicates a presence of a stationary entity that is proximate to the vehicle 702 and/or a classification of the stationary entity as a type (e.g., building, tree, road surface, curb, sidewalk, unknown, etc.). In additional or alternative examples, the perception component 722 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The object detection system 724 may be perform any of the techniques described with respect to any of FIGS. 1-6B above with respect detecting objects, determining optimal door responses, and/or controlling the doors based on the responses.

The prediction component 726 may generate one or more probability maps representing prediction probabilities of possible locations of one or more objects in an environment. For example, the prediction component 726 may generate one or more probability maps for vehicles, pedestrians, animals, and the like within a threshold distance from the vehicle 702. In some instances, the prediction component 726 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 726 may generate predicted trajectories of objects (e.g., objects) in an environment. For example, the prediction component 726 may generate one or more predicted trajectories for objects within a threshold distance from the vehicle 702. In some examples, the prediction component 726 may measure a trace of an object and generate a trajectory for the object based on observed and predicted behavior.

In general, the planner component 728 may determine a path for the vehicle 702 to follow to traverse through an environment. For example, the planner component 728 may determine various routes and trajectories and various levels of detail. For example, the planner component 728 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 728 may generate an instruction for guiding the vehicle 702 along at least a portion of the route from the first location to the second location. In at least one example, the planner component 728 may determine how to guide the vehicle 702 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 728 may select a trajectory for the vehicle 702.

In other examples, the planner component 728 may alternatively, or additionally, use data from the localization component 720, the perception component 722, and/or the prediction component 726 to determine a path for the vehicle 702 to follow to traverse through an environment. For example, the planner component 728 may receive data (e.g., object data) from the localization component 720, the perception component 722, and/or the prediction component 726 regarding objects associated with an environment. In some examples, the planner component 728 receives data for relevant objects within the environment. Using this data, the planner component 728 may determine a route to travel from a first location (e.g., a current location) to a second location (e.g., a target location) to avoid objects in an environment. In at least some examples, such a planner component 728 may determine there is no such collision-free path and, in turn, provide a path that brings vehicle 702 to a safe stop avoiding all collisions and/or otherwise mitigating damage.

In at least one example, the vehicle computing device 704 may include one or more system controllers 732, which may be configured to control steering, propulsion, braking, safety, emitters, communication, and other systems of the vehicle 702. The system controller(s) 732 may communicate with and/or control corresponding systems of the drive system(s) 714 and/or other components of the vehicle 702.

The memory 718 may further include one or more maps 730 that may be used by the vehicle 702 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 702 may be controlled based at least in part on the map(s) 730. That is, the map(s) 730 may be used in connection with the localization component 720, the perception component 722, the prediction component 726, and/or the planner component 728 to determine a location of the vehicle 702, detect objects in an environment, generate routes, determine actions and/or trajectories to navigate within an environment.

In some examples, the one or more maps 730 may be stored on a remote computing device(s) (such as the computing device(s) 736) accessible via network(s) 734. In some examples, multiple maps 730 may be stored based on, for example, a characteristic (e.g., type of entity, time of day, day of week, season of the year, etc.). Storing multiple maps 730 may have similar memory requirements, but increase the speed at which data in a map may be accessed.

In some instances, aspects of some or all of the components discussed herein may include any models, techniques, and/or machine-learned techniques. For example, in some instances, the components in the memory 718 (and the memory 740, discussed below) may be implemented as a neural network. In some examples, the vehicle may use one or more machine learning models to control the operation of the doors. The one or more models may receive sensor data, door state information, zone information, and/or any other information as input and provide, as output, one or more actions for the one or more doors.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 706 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 706 may include multiple instances of each of these or other types of sensors. For instance, the lidar sensors may include individual lidar sensors located at the corners, front, back, sides, and/or top of the vehicle 702. As another example, the camera sensors may include multiple cameras disposed at various locations about the exterior and/or interior of the vehicle 702. The sensor system(s) 706 may provide input to the vehicle computing device 704. Additionally, or in the alternative, the sensor system(s) 706 may send sensor data, via the one or more networks 734, to the one or more computing device(s) 736 at a particular frequency, after a lapse of a predetermined period of time, in near real-time, etc. Further, the sensor system(s) 706 may also include the multiplane sensor system described above in FIGS. 1-6B.

The vehicle 702 may also include one or more emitters 708 for emitting light and/or sound. The emitter(s) 708 may include interior audio and visual emitters to communicate with passengers of the vehicle 702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 may also include one or more communication connections 710 that enable communication between the vehicle 702 and one or more other local or remote computing device(s). For instance, the communication connection(s) 710 may facilitate communication with other local computing device(s) on the vehicle 702 and/or the drive system(s) 714. Also, the communication connection(s) 710 may allow the vehicle to communicate with other nearby computing device(s) (e.g., computing device 736, other nearby vehicles, etc.) and/or one or more remote sensor system(s) for receiving sensor data. The communications connection(s) 710 also enable the vehicle 702 to communicate with a remote teleoperations computing device or other remote services.

The communications connection(s) 710 may include physical and/or logical interfaces for connecting the vehicle computing device 704 to another computing device or a network, such as network(s) 734. For example, the communications connection(s) 710 may enable Wi-Fi-based communication such as via frequencies defined by the IEEE 702.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include one or more drive systems 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 may include one or more sensor systems to detect conditions of the drive system(s) 714 and/or the surroundings of the vehicle 702. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 714. In some cases, the sensor system(s) on the drive system(s) 714 may overlap or supplement corresponding systems of the vehicle 702 (e.g., sensor system(s) 706).

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 714. Furthermore, the drive system(s) 714 may also include one or more communication connection(s) that enable communication by the respective drive module with one or more other local or remote computing device(s).

In at least one example, the direct connection 712 may provide a physical interface to couple the one or more drive system(s) 714 with the body of the vehicle 702. For example, the direct connection 712 may allow the transfer of energy, fluids, air, data, etc. between the drive system(s) 714 and the vehicle. In some instances, the direct connection 712 may further releasably secure the drive system(s) 714 to the body of the vehicle 702.

In at least one example, the localization component 720, the perception component 722, the object detection system 724, the prediction component 726, the planner component 728, the one or more system controllers 732, and the one or more maps 730 may process sensor data, as described above, and may send their respective outputs, over the one or more network(s) 734, to the computing device(s) 736. In at least one example, the localization component 720, the perception component 722, the object detection system 724, the prediction component 726, the planner component 728, the one or more system controllers 732, and the one or more maps 730 may send their respective outputs to the computing device(s) 736 at a particular frequency, after a lapse of a predetermined period of time, in near real-time, etc.

In some examples, the vehicle 702 may send sensor data to the computing device(s) 736 via the network(s) 734. In some examples, the vehicle 702 may receive sensor data from the computing device(s) 736 and/or remote sensor system(s) via the network(s) 734. The sensor data may include raw sensor data and/or processed sensor data and/or representations of sensor data. In some examples, the sensor data (raw or processed) may be sent and/or received as one or more log files.

The computing device(s) 736 may include processor(s) 738 and a memory 740, which may include an object detecting component 742, a zone component 744, a door state component 746, and/or a door movement component 748. In some examples, the memory 740 may store one or more of components that are similar to the component(s) stored in the memory 718 of the vehicle 702. In such examples, the computing device(s) 736 may be configured to perform one or more of the processes described herein with respect to the vehicle 702. In some examples, the object detecting component 742, the zone component 744, the door state component 746, and/or the door movement component 748 may perform substantially similar functions as the object detection system 724.

The processor(s) 716 of the vehicle 702 and the processor(s) 738 of the computing device(s) 736 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 718 and memory 740 are examples of non-transitory computer-readable media. The memory 718 and memory 740 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 7 is illustrated as a distributed system, in alternative examples, components of the vehicle 702 may be associated with the computing device(s) 736 and/or components of the computing device(s) 736 may be associated with the vehicle 702. That is, the vehicle 702 may perform one or more of the functions associated with the computing device(s) 736, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 8:
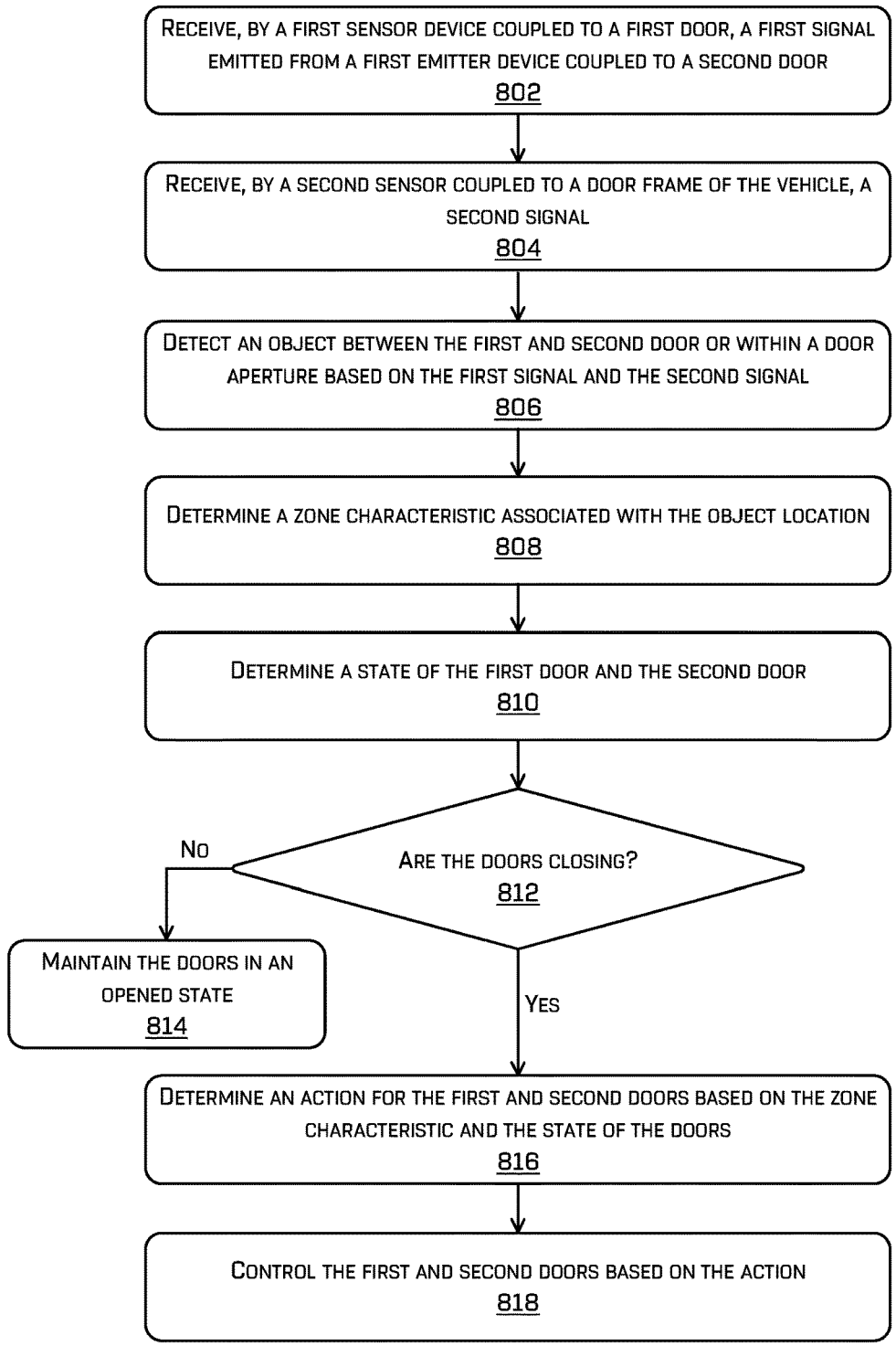
FIG. 8 is a flow diagram illustrating an example process for detecting an object between the doors and/or within the door aperture, determining an action for the doors, and controlling the doors based on the action, in accordance with one or more examples of the disclosure.

FIG. 8 is a flow diagram illustrating an example process 800 for detecting an object between the doors and/or within the door aperture, determining an action for the doors, and controlling the doors based on the action. As described below, process 800 may be performed by one or more computer-based components configured to implement various functionalities described herein. For instance, some or all of the operations of process 800 may be performed by an object detection system 202. As described above, an object detections system 202 may be integrated as an on-vehicle system in some examples.

Process 800 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 802, the object detection system may receive, by a first sensor device coupled to a first door, a first signal emitted from a first emitter coupled to the second door. In some examples, the vehicle may include one or more doors one either side of the vehicle. In such examples, a side of the vehicle may include two laterally adjacent doors and when instructed, such doors may move in a direction substantially outwards and away from the vehicle, in addition to moving along linear paths parallel to the side of the vehicle in opposite directions. In some examples, a door may have multiple emitting and receiving sensor devices mounted or installed at different locations along the inside edge (e.g., relative to opening created for ingress and egress) of the door. Such sensor devices may be oriented in a substantially horizontal direction, and as such, may be configured to capture sensor data representing the region between the doors.

At operation 804, the object detection system may receive, by a second sensor coupled to a door frame of the vehicle, a second signal. In some examples, the vehicle may have a door frame configured to receive and/or support the door(s) while in a closed state. The door frame may outline an opening (e.g., door aperture) created by the doors when such doors move to an opened state. The door aperture may be on a plane that is flush with the side of the vehicle. In such instances, occupants (or potential occupants) may utilize the door aperture to enter and/or exit the vehicle. In some examples, the door frame may have multiple emitting and/or receiving sensor devices mounted or installed at different locations along the roof and/or floor portions of the door frame. The emitting and/or receiving sensor devices may be oriented substantially vertically, and as such, may be configured to capture sensor data representing the region within the door aperture. In some examples, the emitting and receiving sensors located on the roof portion of the door frame may be paired with emitting and/or receiving sensor devices on the floor portion of the door frame.

At operation 806, the object detection system may detect an object between the first and second doors or within a door aperture based on the first signal and the second signal. In some examples, the object detection system may use the sensor devices located in the doors and/or the door frame to detect objects between the doors and/or within the door aperture. The object detection system may capture sensor data during any time the doors are in a non-closed state. As such, the object detection system may receive sensor data from the sensor devices while the doors are fully open or partially open.

At operation 808, the object detection system may determine a zone characteristic associated with the object location. A zone characteristic may affect the type of action provided to the door(s). The zone characteristic may be determined based on the location at which the object intersects a first plane (e.g., established by the door sensors) and/or second plane (e.g., established by the door frame sensors). In some examples, the object detection system may determine a zoning scheme which may include a number of zones of different dimensions and locations. In some instances, each zone may be associated with a particular level which may correlate to a zone characteristic. In some examples, the object detection system may determine the dimensions and/or locations of the zones based on various factors, such as the state of the doors, the distance between the doors, the speed at which the doors are moving, and/or any other factor. In some examples, the object detection system may determine a single zone scheme covering both planes. Alternatively, the object detection system may determine different zone schemes for the first plane and the second plane, respectively. In some examples, the object detection system may determine a different door response based on the zone characteristic.

At operation 810, the object detection system may determine a state of the first door and the second door. In some examples, the object detection system may determine whether each of the doors are in an opened state, a closed state, an opening state, or a closing state. The object detection system may receive and/or request such information from one or more vehicle databases. The state of the door(s) may impact the action provided to the doors.

At operation 812, the object detection system may determine whether the doors are in a closing or opening state. If the first door or the second door are not in a closing state (812: No), then the object detection system may maintain the doors in an opened state. For example, if an object is detected between the doors and the doors are not in a closing or opening state, the doors are in a fully opened state.

In contrast, if the first door and/or the second doors are in a closing state (812: Yes), then the object detection system may determine an action for the first and second doors. At operation 816, the object detection system may determine an action for the first and second doors based on the zone characteristic and the state of the doors. The object detection system may determine the action for the doors based on evaluating the state of the doors and/or the zone characteristic associated with detected object. The object detection system may determine the same or similar actions for some or all doors. Alternatively, the object detection system may determine a different action for some or all doors. In some examples, the actions may include instructing the doors to move (e.g., transition) to an opened state, to stop all movement, and/or to move to a closed state. At operation 818, the object detection system may control the first and second doors based on the action.

Example Clauses

A: A vehicle comprising: a first door and a second door that are laterally adjacent and configured to move along non-linear paths; a first emitter device coupled to the first door, the first emitter device configured to emit a first signal; a first sensor device coupled to the second door, the first sensor device configured to detect the first signal, wherein the first emitter device and the first sensor device are associated with a first plane; a door frame defining a door aperture, the first door and the second door being disposed in the door frame when in a closed state; a second emitter device coupled to the door frame and configured to emit a second signal; a second sensor device coupled to the door frame, the second sensor device configured to detect the second signal, wherein the second emitter device and the second sensor device are associated with a second plane that is interior to the first plane; and an object detection system configured to detect an object intersecting the first plane or the second plane.

B: The vehicle of paragraph A, wherein: the second emitter device is disposed on a first side of the door frame and the second sensor device is disposed on a second side of the door frame opposite the first side, or the second emitter device and the second sensor device are disposed on the first side of the door frame and a reflective surface is disposed on the second side of the door frame and configured to reflect the second signal emitted from the second emitter device back toward the second sensor device.

C: The vehicle of paragraph A, wherein the second emitter device is disposed in a roof of the door frame or a floor of the door frame and is configured to emit the second signal in a substantially vertical direction, and wherein the second sensor device is disposed in the roof of the door frame or the floor of the door frame.

D: The vehicle of paragraph A, wherein the first plane is a dynamic plane configured to move relative to the second plane.

E: The vehicle of paragraph A, wherein the first emitter is oriented to emit the first signal in a substantially horizontal direction, and the second emitter is oriented to emit the second signal in a substantially vertical direction.

F: One or more non-transitory computer-readable media storing instructions executable by one or more processors, wherein the instructions, when executed, cause the one or more processors to perform operations comprising: receiving, by a first sensor device associated with a door or a door frame of a vehicle, a first signal, wherein the first sensor device is associated with a first plane; receiving, by a second sensor device associated with the door or the door frame of the vehicle, a second signal, wherein the second sensor device is associated with a second plane that is different to the first plane; detecting, based at least in part on the first signal or the second signal, an object intersecting at least one of the first plane or the second plane; determining a state of the door; determining, based at least in part on the state, an action for the door; and controlling the door based at least in part on the action.

G: The one or more non-transitory computer-readable media of paragraph F, wherein determining the action comprises determining a zone characteristic associated with the object intersecting the first plane or the second plane, and wherein determining the zone characteristic comprises: determining a first zone and a second zone associated with at least one of the first plane or the second plane, wherein the first zone has a first characteristic and the second zone has a second characteristic that is different than the first characteristic; determining a location of the object intersecting at least one of the first plane or the second plane; determining that the location of the object intersecting the at least one of the first plane or the second plane is associate with the first zone; and causing, based at least in part on the location of the object being associated with the first zone, the door to operate in accordance with the first characteristic.

H: The one or more non-transitory computer-readable media of paragraph G, wherein a size of the second zone is based at least in part on a position of the door.

I: The one or more non-transitory computer-readable media of paragraph F, wherein the second plane is a dynamic plane configured to move relative to the first plane.

J: The one or more non-transitory computer-readable media of paragraph I, wherein the first plane is defined by the first sensor device disposed on the door frame, and wherein the dynamic plane is defined by the second sensor device disposed on the door.

K: The one or more non-transitory computer-readable media of paragraph F, wherein the action comprises one of: causing a direction of the door to change, or causing a speed of the door to change.

L: The one or more non-transitory computer-readable media of paragraph F, wherein the second sensor device receives the second signal from an emitter: disposed at a different surface of the vehicle relative to the second sensor device, or disposed at a same surface of the vehicle relative to the second sensor device, wherein the second signal is reflected off of a reflective surface disposed at different surface of the vehicle relative to the second sensor device and the emitter.

M: The one or more non-transitory computer-readable media of paragraph F, wherein the first sensor is oriented to receive the first signal in a substantially horizontal direction, and the second sensor is oriented to receive the second signal in a substantially vertical direction.

N: The one or more non-transitory computer-readable media of paragraph F, wherein determining the action for the door is further based at least in part on: determining that the object intersected the first plane at a first time and intersected the second plane at a second time; and determining, based at least in part on comparing the first time with the second time, whether the object is moving into or out of the vehicle.

O: A method comprising: receiving, by a first sensor device associated with a door or a door frame of a vehicle, a first signal, wherein the first sensor device is associated with a first plane; receiving, by a second sensor device associated with the door or the door frame of the vehicle, a second signal, wherein the second sensor device is associated with a second plane that is different to the first plane; detecting, based at least in part on the first signal or the second signal, an object intersecting at least one of the first plane or the second plane; determining a state of the door; determining, based at least in part on the state, an action for the door; and controlling the door based at least in part on the action.

P: The method of paragraph O, wherein determining the action comprises determining a zone characteristic associated with the object intersecting the first plane or the second plane, and wherein determining the zone characteristic comprises: determining a first zone and a second zone associated with at least one of the first plane or the second plane, wherein the first zone has a first characteristic and the second zone has a second characteristic that is different than the first characteristic; determining a location of the object intersecting at least one of the first plane or the second plane; determining that the location of the object intersecting the at least one of the first plane or the second plane is associate with the first zone; and causing, based at least in part on the location of the object being associated with the first zone, the door to operate in accordance with the first characteristic.

Q: The method of paragraph O, wherein the second plane is a dynamic plane configured to move relative to the first plane.

R: The method of paragraph Q, wherein the first plane is defined by the first sensor device disposed on the door frame, and wherein the dynamic plane is defined by the second sensor device disposed on the door.

S: The method of paragraph O, wherein the second sensor device receives the second signal from an emitter: disposed at a different surface of the vehicle relative to the second sensor device, or disposed at a same surface of the vehicle relative to the second sensor device, wherein the second signal is reflected off of a reflective surface disposed at different surface of the vehicle relative to the second sensor device and the emitter.

T: The method of paragraph O, wherein the first sensor is oriented to receive the first signal in a substantially horizontal direction, and the second sensor is oriented to receive the second signal in a substantially vertical direction.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to mean that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A vehicle comprising:
   a first door and a second door that are laterally adjacent and configured to move along non-linear paths;
   a first emitter device coupled to the first door, the first emitter device configured to emit a first signal;
   a first sensor device coupled to the second door, the first sensor device configured to detect the first signal, wherein the first emitter device and the first sensor device are associated with a first plane;
   a door frame defining a door aperture, the first door and the second door being disposed in the door frame when in a closed state;
   a second emitter device coupled to the door frame and configured to emit a second signal;
   a second sensor device coupled to the door frame, the second sensor device configured to detect the second signal, wherein the second emitter device and the second sensor device are associated with a second plane that is interior to the first plane; and
   an object detection system configured to detect an object intersecting the first plane or the second plane, wherein the object detection system is configured to determine a direction of travel associated with the object.

2. The vehicle of claim 1, wherein:
   the second emitter device is disposed on a first side of the door frame and the second sensor device is disposed on a second side of the door frame opposite the first side, or
   the second emitter device and the second sensor device are disposed on the first side of the door frame and a reflective surface is disposed on the second side of the door frame and configured to reflect the second signal emitted from the second emitter device back toward the second sensor device.

3. The vehicle of claim 1, wherein the second emitter device is disposed in a roof of the door frame or a floor of the door frame and is configured to emit the second signal in a substantially vertical direction, and wherein the second sensor device is disposed in the roof of the door frame or the floor of the door frame.

4. The vehicle of claim 1, wherein the first plane is a dynamic plane configured to move relative to the second plane.

5. The vehicle of claim 1, wherein the first emitter device is oriented to emit the first signal in a substantially horizontal direction, and the second emitter device is oriented to emit the second signal in a substantially vertical direction.

6. One or more non transitory computer readable media storing instructions executable by one or more processors, wherein the instructions, when executed, cause the one or more processors to perform operations comprising:
   receiving, by a first sensor device associated with a door or a door frame of a vehicle, a first signal, wherein the first sensor device is associated with a first plane;
   receiving, by a second sensor device associated with the door or the door frame of the vehicle, a second signal, wherein the second sensor device is associated with a second plane that is different to the first plane, wherein the second plane is interior to the first plane;
   detecting, based at least in part on the first signal or the second signal, an object intersecting at least one of the first plane or the second plane;
   determining a direction of travel associated with the object;
   determining a state of the door;
   determining, based at least in part on the state and the direction of travel, an action for the door; and
   controlling the door based at least in part on the action.

7. The one or more non transitory computer readable media of claim 6, wherein determining the action comprises determining a zone characteristic associated with the object intersecting the first plane or the second plane, and wherein determining the zone characteristic comprises:
   determining a first zone and a second zone associated with at least one of the first plane or the second plane, wherein the first zone has a first characteristic and the second zone has a second characteristic that is different than the first characteristic;
   determining a location of the object intersecting at least one of the first plane or the second plane;
   determining that the location of the object intersecting at least one of the first plane or the second plane is associate with the first zone; and
   causing, based at least in part on the location of the object being associated with the first zone, the door to operate in accordance with the first characteristic.

8. The one or more non transitory computer readable media of claim 7, wherein a size of the second zone is based at least in part on a position of the door.

9. The one or more non transitory computer readable media of claim 6, wherein the second plane is a dynamic plane configured to move relative to the first plane.

10. The one or more non transitory computer readable media of claim 9, wherein the first plane is defined by the first sensor device disposed on the door frame, and wherein the dynamic plane is defined by the second sensor device disposed on the door.

11. The one or more non transitory computer readable media of claim 6, wherein the action comprises one of:
    causing a direction of the door to change, or
    causing a speed of the door to change.

12. The one or more non transitory computer readable media of claim 6, wherein the second sensor device receives the second signal from an emitter:

disposed at a different surface of the vehicle relative to the second sensor device, or disposed at a same surface of the vehicle relative to the second sensor device, wherein the second signal is reflected off of a reflective surface disposed at different surface of the vehicle relative to the second sensor device and the emitter.

13. The one or more non transitory computer readable media of claim 6, wherein the first sensor device is oriented to receive the first signal in a substantially horizontal direction, and the second sensor device is oriented to receive the second signal in a substantially vertical direction.

14. The one or more non transitory computer readable media of claim 6, wherein determining the action for the door is further based at least in part on:
   determining that the object intersected the first plane at a first time and intersected the second plane at a second time; and
   determining, based at least in part on comparing the first time with the second time, whether the object is moving into or out of the vehicle.

15. A method comprising:
   receiving, by a first sensor device associated with a door or a door frame of a vehicle, a first signal, wherein the first sensor device is associated with a first plane;
   receiving, by a second sensor device associated with the door or the door frame of the vehicle, a second signal, wherein the second sensor device is associated with a second plane that is different to the first plane, wherein the second plane is interior to the first plane;
   detecting, based at least in part on the first signal or the second signal, an object intersecting at least one of the first plane or the second plane;
   determining a direction of travel associated with the object;
   determining a state of the door;
   determining, based at least in part on the state and the direction of travel, an action for the door; and
   controlling the door based at least in part on the action.

16. The method of claim 15, wherein determining the action comprises determining a zone characteristic associated with the object intersecting the first plane or the second plane, and wherein determining the zone characteristic comprises:
   determining a first zone and a second zone associated with at least one of the first plane or the second plane, wherein the first zone has a first characteristic and the second zone has a second characteristic that is different than the first characteristic;
   determining a location of the object intersecting at least one of the first plane or the second plane;
   determining that the location of the object intersecting at least one of the first plane or the second plane is associate with the first zone; and
   causing, based at least in part on the location of the object being associated with the first zone, the door to operate in accordance with the first characteristic.

17. The method of claim 15, wherein the second plane is a dynamic plane configured to move relative to the first plane.

18. The method of claim 17, wherein the first plane is defined by the first sensor device disposed on the door frame, and wherein the dynamic plane is defined by the second sensor device disposed on the door.

19. The method of claim 15, wherein the second sensor device receives the second signal from an emitter:
   disposed at a different surface of the vehicle relative to the second sensor device, or
   disposed at a same surface of the vehicle relative to the second sensor device, wherein the second signal is reflected off of a reflective surface disposed at different surface of the vehicle relative to the second sensor device and the emitter.

20. The method of claim 15, wherein the first sensor device is oriented to receive the first signal in a substantially horizontal direction, and the second sensor device is oriented to receive the second signal in a substantially vertical direction.

* * * * *